United States Patent
Bhagat et al.

(10) Patent No.: US 9,886,441 B2
(45) Date of Patent: Feb. 6, 2018

(54) SHARD AWARE NEAR REAL TIME INDEXING

(71) Applicant: SAP SE, Walldorf (DE)

(72) Inventors: Prashant Bhagat, Cupertino, CA (US); Ridwan Tan, Fremont, CA (US); Robert Wells, East Palo Alto, CA (US); Dinesh Shahane, Cupertino, CA (US); Sushant Prasad, Sunnyvale, CA (US); Kiran Gangadharappa, Mountain View, CA (US)

(73) Assignee: SAP SE, Walldorf (DE)

( * ) Notice: Subject to any disclaimer, the term of this patent is extended or adjusted under 35 U.S.C. 154(b) by 271 days.

(21) Appl. No.: 14/737,317

(22) Filed: Jun. 11, 2015

(65) Prior Publication Data

US 2016/0292171 A1    Oct. 6, 2016

Related U.S. Application Data

(60) Provisional application No. 62/143,619, filed on Apr. 6, 2015.

(51) Int. Cl.
*G06F 17/30* (2006.01)
*G06F 9/50* (2006.01)

(52) U.S. Cl.
CPC .......... *G06F 17/30094* (2013.01); *G06F 9/50* (2013.01); *G06F 17/30336* (2013.01); *G06F 17/30557* (2013.01)

(58) Field of Classification Search
CPC .......... G06F 17/30094; G06F 17/3087; G06F 17/30076; G06F 17/30209; G06F 17/30; G06F 17/30312; G06F 17/30292; G06F 17/30215; G06F 17/30569; G06F 17/30306; G06F 17/30598; G06F 17/30876; G06F 17/30345; G06F 11/1409; G06F 17/30557; G06F 9/50; G06F 17/30336

See application file for complete search history.

(56) References Cited

U.S. PATENT DOCUMENTS

| | | | | |
|---|---|---|---|---|
| 8,868,408 B2 * | 10/2014 | Spears | ............. | G06F 17/30867 704/1 |
| 9,298,760 B1 * | 3/2016 | Li | ..................... | G06F 17/30321 707/E17.009 |
| 9,563,486 B1 * | 2/2017 | Narsude | ............ | G06F 17/30569 707/E17.005 |
| 9,747,320 B2 * | 8/2017 | Kesselman | ......... | G06F 17/3033 707/E17.004 |
| 2008/0307414 A1 * | 12/2008 | Alpern | ................ | G06F 9/45558 718/1 |

(Continued)

*Primary Examiner* — Anh Ly
(74) *Attorney, Agent, or Firm* — Schwegman Lundberg & Woessner, P.A.

(57) ABSTRACT

In an example embodiment, data to be indexed in a distributed file system is received via a near real time publish application program interface (API). A shard responsible for the data to be indexed is determined. Then a message is generated in a shard queue corresponding to the shard responsible for the data to be indexed, the message indicating that data needs to be urgently indexed, the detection of the message in the shard queue by a near real time manager corresponding to the shard responsible for the data to be indexed causing the near real time manager to cause the data to be indexed.

17 Claims, 10 Drawing Sheets

(56) References Cited

U.S. PATENT DOCUMENTS

| | | | | |
|---|---|---|---|---|
| 2013/0024443 A1* | 1/2013 | Achuthan | ......... | G06F 17/30392 707/722 |
| 2013/0047230 A1* | 2/2013 | Krishnan | .............. | H04L 63/102 726/7 |
| 2013/0290249 A1* | 10/2013 | Merriman | ......... | G06F 17/30584 707/610 |
| 2014/0214906 A1* | 7/2014 | Barnes | .............. | G06F 17/30091 707/812 |
| 2014/0372486 A1* | 12/2014 | Bose | ................ | G06F 17/30595 707/792 |
| 2014/0372489 A1* | 12/2014 | Jaiswal | ............. | G06F 17/30371 707/812 |
| 2014/0372702 A1* | 12/2014 | Subramanyam | .... | G06F 12/0848 711/129 |
| 2015/0081243 A1* | 3/2015 | Ganai | ................ | G06F 11/3688 702/123 |
| 2015/0237157 A1* | 8/2015 | Wang | ................ | H04L 67/2809 714/4.11 |

* cited by examiner

US 9,886,441 B2

SHARD AWARE NEAR REAL TIME INDEXING

CROSS-REFERENCE TO RELATED APPLICATION

This application is a Non-Provisional of and claims the benefit of priority under 35 U.S.C. §119(e) from U.S. Provisional Application Ser. No. 62/143,619, entitled "SHARD AWARE NEAR REAL TIME INDEX," filed on Apr. 6, 2015 which is hereby incorporated by reference herein in its entirety.

TECHNICAL FIELD

This document generally relates to methods and systems for use with computer networks. More particularly, in example embodiments this document relates to real-time indexing of data based on shards.

BACKGROUND

The indexing and searching of structured data are important functionalities for many businesses on both sides of sales transactions. For example, sellers may provide access to catalog data (including, for example, product information on various products for sale) to buyers to allow buyers to select items to purchase or contract for. This type of usage is especially prevalent for businesses, which often procure items in large quantities directly from a supplier. Traditionally, such structured data was stored in dedicated databases. An authorized buyer, for example, would gain viewing access to a supplier's database and thus be able to search directly the products in the database.

Recently there has been increased movement of data to the cloud. In such cloud environments, there is a lot more data (in both quantity and size) to be stored. This can complicate the process of indexing the data in order for it to be efficiently stored and searched.

BRIEF DESCRIPTION OF DRAWINGS

The present disclosure is illustrated by way of example and not limitation in the following figures.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, near real time search of indexes in a multi-tenant infrastructure is provided allowing for faster searches with more capabilities. This is accomplished by having data be indexed in near real time, allowing it then to be searched in near real time. In this example embodiment, each shard is assigned a queue where messages indicating the availability of a piece of data needing indexing and a near real time manager that monitors the corresponding queue and acts upon such messages to index the piece of data in near real time. Prior to discussing the queue and near real time manager, the present disclosure will describe how shards operate in an example embodiment.

Figure 1:
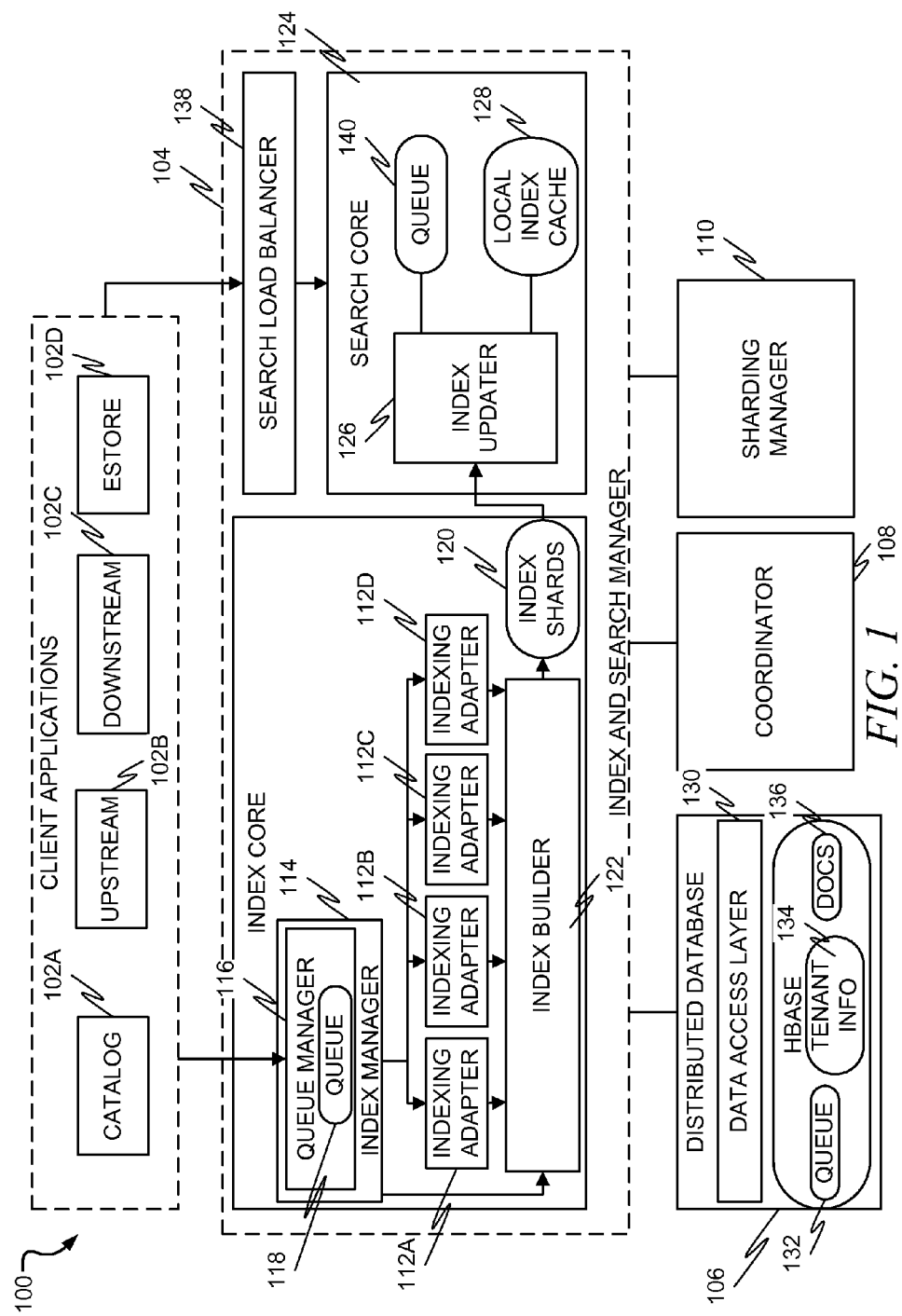
FIG. 1 is a block diagram illustrating a system, in accordance with an example embodiment, for indexing and searching structured data.

FIG. 1 is a block diagram illustrating a system 100, in accordance with an example embodiment, for indexing and searching structured data. The system 100 includes one or more client applications 102A, 102B, 102C, 102D, an index and search manager 104, a distributed database 106, a coordinator 108, and a sharding manager 110. Each client application 102A, 102B, 102C, 102D may represent a different application providing data to be indexed and eventually searched by the system 100. A single tenant (e.g., a customer such as a company) may provide multiple clients, while other tenants may provide just a single client. In the depicted figure, client application 102A is or includes a catalog application, client application 102B is or includes an upstream application, client application 102C is or includes a downstream application, and client application 102D is or includes an eStore application.

Client applications 102A, 102B, 102C, 102D may provide one or more of three different types of data streams (not pictured). Each data stream may have its own different data with distinct lifecycle and purpose. These data streams may be known as primary, auxiliary, and relevance and ranking (R/R). The primary data stream may include primary data, which is the data that is the main subject of indexing and searching. The auxiliary data stream may include data that is not directly indexed or searched but may enrich the primary data. The R/R data stream may include R/R data, which is data that plays a role in relevance and ranking of primary data items during searching. As illustrative examples, if the client application 102A provides a catalog, the primary data may include Catalog Interchange Format (CIF) and Catalog Extensible Markup Language (cXML) catalogs, with the auxiliary data including supplier records, type definitions, contracts, and views, and the R/R data including a click stream and transaction data. If the client application 102B provides upstream information, the primary data may include contracts and projects, with the auxiliary data including entitlement information and the R/R data including a click stream. If the client application 102C provides downstream information, the primary data may include approvables, with the auxiliary data including master data and the R/R data including transaction data.

Data streams can be transported as single documents, a multi-part collection, or a set of documents. For each client application 102A, 102B, 102C, 102D, an indexing adapter 112A, 112B, 112C, 112D may be provided. Each indexing adapter 112A, 112B, 112C, 112D can include a parser created to parse document types supported by the corresponding client application 102A, 102B, 102C, 102D. As an example, client application 102A, providing catalog data, may utilize indexing adapter 112A, which may include a CIF parser (to parse primary CIF catalog data) and various XM parsers for the auxiliary data, such as kit information, Units of Measure (UOM) map, etc. Each parser may have two modes. The first mode can parse the byte stream of the incoming documents into rows. The second mode can parse the rows into an indexable object.

As pictured, the indexing adapters 112A, 112B, 112C, 112D may actually be contained in the index and search manager 104. An index manager 114 may act to manage the indexing process. This may include a queue manager 116 which manages a queue 118 containing incoming data from the client applications 102A, 102B, 102C, 102D, which needs to be indexed. The index manager 114 may act to send data at the front of the queue 118 to the appropriate indexing adapter 112A, 112B, 112C, 112D for the corresponding client while also building a request to an index builder.

In an example embodiment, the index manager 114 may have a redundant architecture that provides an application programming interface (API) to the client applications 102A, 102B, 102C, 102D to allow the client applications 102A, 102B, 102C, 102D to submit indexing jobs. The indexing message produced through the API may contain enough information to uniquely identify the request. This identification could be used to track the status of the submitted jobs.

The index manager 114 may utilize feedback from the distributed database 106 to decide on the indexing jobs to be run in the database 106 to allow a scalable computing architecture for building index shards 120. Specifically, the index manager 114 may send a request to build an index to the index builder 122, which may build the index shards 120. A search core 124 may contain an index updater 126, which can take the index shards 120 and update a local index cache 128 using the index shards 120. This local index cache 128 can then be synchronized with a network file system, which can then distribute the index to the distributed database 106. Each index shard 120 is a subset of the index for a given file type. For example, a shard could include catalog items from a subset of tenants. For large catalogs, a single catalog may span multiple index shards 120.

The distributed database 106 may contain a data access layer 130, a queue 132, tenant information 134, and documents 136.

The search core 124 may host a Lucene index and answer search queries via search load balancer 138, which acts to balance the load of search requests among multiple instantiations of the search cores 124 on multiple physical or logical servers. The search core 124 may also expose a REST-based search and faceting API (not pictured). The search core 124 may perform aggregation, faceting, ranking, and relevance algorithms on search results. The source documents are primary indexing targets. Each source document may store a document identification key for auxiliary data. In an example embodiment, the auxiliary data itself is stored in the same index shard 120. This allows for locality of reference, so that access to an auxiliary data item related to a primary data item can be easily retrieved during a search.

The search core 124 may keep track of recent changes to the local index cache 128 in a special queue 140 receiving the updates to support search. The updates may be immediately applied to the reader but may be batched before committing to the local index segments.

The index manager 114 may use information from the coordinator 108 and the sharding manager 110 to decide on the indexing jobs to be run in the distributed database 106 to allow a scalable computing architecture for building the index shards 120.

Each index shard 120 may contain Lucene index segments for a set of tenants, as will be described in more detail below. The job of indexing may be designed as a map-reduce job that parses the source document and any auxiliary documents to create the Lucene indexing segments.

Within the local index cache 128, the primary documents may be modeled as Lucene "documents". The document fields, their indexing properties (stored, indexed, etc.), norms, etc. may be modeled in the bundle providing the local index cache 128. The auxiliary document identifications may be stored in the Lucene document for linking the auxiliary data. The actual auxiliary documents may be stored in the same index as separate documents 136. For example, a single shard may contain documents 136 relating to a first tenant, including a first catalog item (with item attributes and supplied identification), a second catalog item (with item attributes and supplied identification), a third catalog item (with item attributes and supplied identification), and a supplier document with three different supplier detail files. The supplier document is a single document with the supplier detail files being auxiliary documents. The supplier document may be stored with a key matching the supplier identification field in each source document in the index.

The coordinator 108 may implement a protocol for routing, shard configuration, rolling-apply, and other management functions. The coordinator 108 may additionally provide the node status and consensus protocol.

The sharding manager 110 may implement the elasticity architecture for distributing the index across search cores 124. In an example embodiment, the sharding manager 110 may receive a HyperText Transfer Protocol (HTTP) request for a search and is aware of which search core 124 can respond to this request. It can then route the request to the specific search core 124, perhaps based, at least partially, on load balancing if multiple search cores 124 can respond to the request. The search core 124 may then use libraries to parse the queries and launch a search and then respond with matches found in an extensible markup language (XML) document. The XML document may comprise primary data along with the supporting auxiliary data In an example embodiment, data from the client applications 102A, 102B, 102C, 102D is indexed to be stored in a multi-tenant, multi-modal, distributed database (e.g., distributed database 106). "Multi-tenant" means that the data from one entity is stored along with the data from another entity, which, as will be seen, makes storage more efficient. "Multimodal" means that data from multiple client applications 102A, 102B, 102C, 102D of a single entity, including data that is parsed using a completely separate indexing adapter 112A, 112B, 112C, 112D, can be stored within that tenant's area of the distributed database 106. The distributed database 106 itself can then be distributed among multiple physical and/or logical servers.

Additionally, as will be discussed in more detail below, the distribution of the distributed database 106 can be dynamically altered so that tenants can be dynamically reassigned to different physical and/or logical servers at any time. This may be based, for example, on need, which may be based on a combination of factors, including data size, data quantity, size of the entity, and frequency of search.

As described briefly above, sharding allows for the segmentation of large amounts of data to the indexed. A segment may also be known as a tenant and represents a parameter for segmenting data. It can map to a platform tenant or some other type of entity. An object class is a search infrastructure used to support the searching of data items. The object class defines the data. It can indicate that the data is, for example, catalog data, requisition data, contract data, etc.

In an example embodiment, sharding is driven by four goals: availability, scalability, elasticity, and flexibility. Availability indicates that indexed data should be highly available (e.g., little chance of being unable to access the data at any point in time, even if some storage locations are inaccessible or down). Scalability indicates that the search infrastructure should be able to function well as the size grows, both in terms of index size and in terms of search volume. Elasticity indicates that there is an ability to dynamically assign capacity to tenants to make it easier to plan capacity and achieve better resource utilization. Flexibility indicates that different scalability requirements for different tenants or data classes can be supported.

As described above, the indexing itself may be performed using Lucene indexes. Lucene works by taking documents 136 and fields. A document in Lucene is a class that represents a searchable item. The document is converted into a stream of plain-text tokens. The tokens are then analyzed to make the tokens more friendly for indexing and storage. Then the tokens are stored in an inverted index. Additional details about Lucene indexes are beyond the scope of this disclosure.

Figure 2:
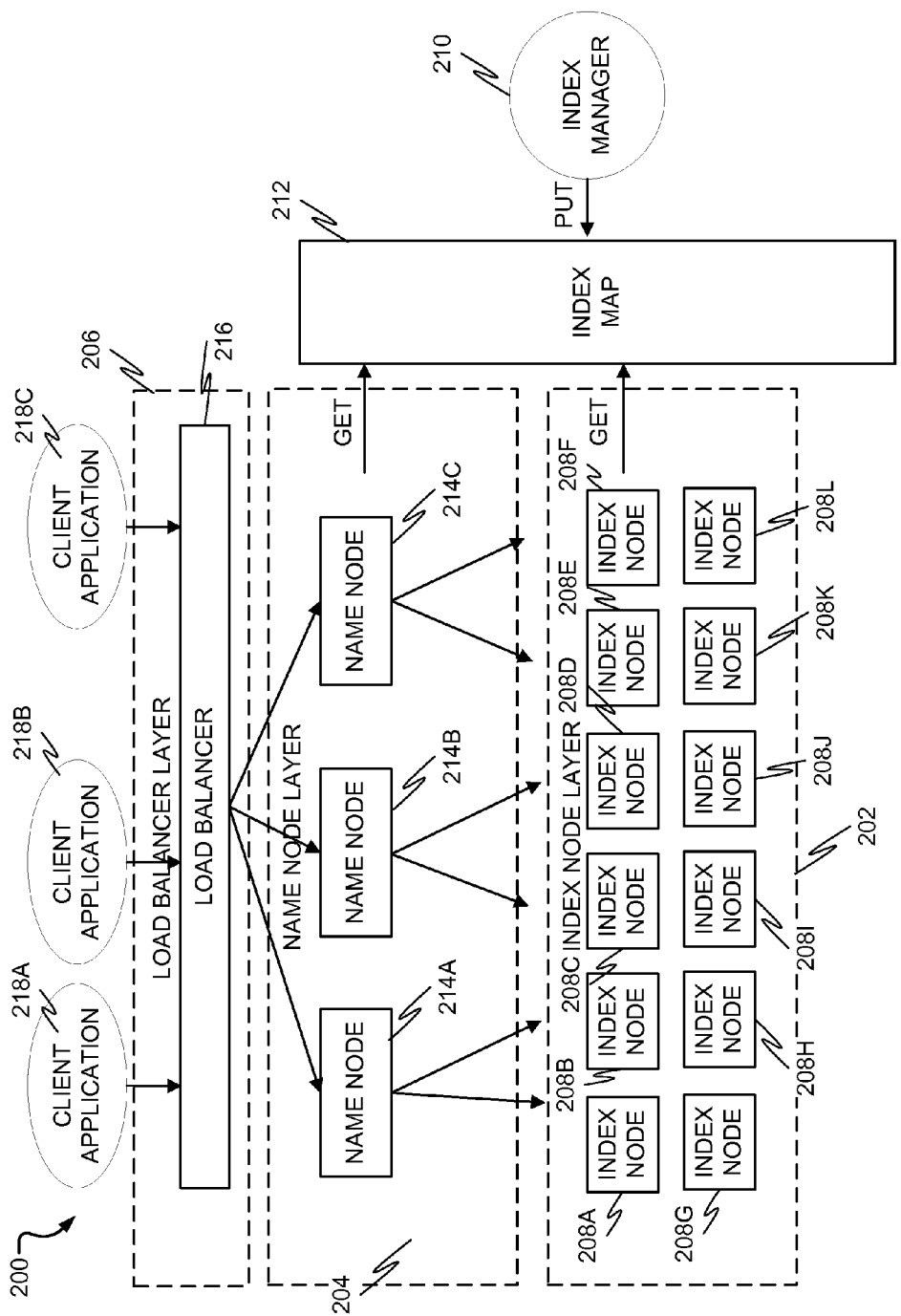
FIG. 2 is a block diagram illustrating a search infrastructure in accordance with an example embodiment.

FIG. 2 is a block diagram illustrating a search infrastructure 200 in accordance with an example embodiment. The search infrastructure 200 includes three layers: an index node layer 202, a name node layer 204, and a load balancer layer 206.

In an example embodiment, the index node layer 202 may comprise a plurality of index nodes 208A-208L, each index node 208A-208L comprising a virtual machine. In addition, each index node 208A-208L can be referred to as a shard. Each shard holds a piece of an index (or sometimes the whole index) for a given tenant. Index nodes 208A-208L are responsible for executing searches on the index. It is possible that the entire tenant index fits in a single shard, but the design may assume that the tenant index may need to be distributed across multiple shards. The index manager 210 is responsible for mapping tenants to shards. The mapping information is stored in an index map 212. A federated query (query based on information from multiple sources) may be used if the tenant data is indexed to multiple shards. An index node 208A-208L may look at the tenant-to-shard mapping data stored in the index map 212 to determine if it needs to execute a local search or a federated search.

Elasticity may be accomplished by adding more index nodes 208A-208L as the index size grows or more tenants are added. Additionally, one failed index node 208A-208L should not cause searches to fail. In order to accomplish this, the index manager 210 can replicate the tenant data into two or more shards. In other words, any given index segment for a given tenant can be served by at least two index nodes 208A-208L.

The name node layer 204 may include a plurality of name nodes 214A-214C. Each name node 214A-214C may be an application responsible for mapping a client search request to an index node 208A-208L. Even though any index node 208A-208L may be capable of serving any search request, the goal of the name node 214A-214C is to select an index node 208A-208L that holds at least part of the tenant index. Thus, in the best-case scenario, the local search is executed by the index node 208A-208L that contains the data in its local index.

In an example embodiment, each name node 214A-214C may look at tenant-to-shard mapping data stored in the index map 212. The name node 214A-214C may perform a lookup on the index map 212 and then redirect the search request to the appropriate index node 208A-208L.

The load balancer layer 206 may include a load balancer 216, whose job it is to receive inbound search requests from client applications 218A-218C and invoke one or more name nodes 214A-214C to satisfy the search requests. The load balancer 216 acts to load balance these search requests among the name nodes 214A-214C.

The index manager 210 may be responsible for assigning tenants to shards. This mapping may be dynamic (e.g., the shards may be assigned to the tenants on demand at runtime). Elasticity may be accomplished by dynamically assigning available capacity to tenants on an as-needed basis.

In an example embodiment, the index manager 210 may include a tool used for capacity planning. The goal is to plan enough capacity to support the data needs for all the tenants.

In an example embodiment, the index manager 210 may be implemented by a set of nodes connected to a coordinator 108 in an active-passive type configuration. One of the index manager nodes can be elected as the primary node by the coordinator 108. The backup index manager nodes can watch the "status" of the primary node and take over if needed. As will be described later, the index manager 210 can be collated with a queue manager 116. The primary API for the index manager 210 may be based on asynchronous queue-based messaging and therefore it makes sense to have the node play a dual role.

In an example embodiment, the index manager node subscribes to one or more tenant queues to receive indexing instructions. This may be the primary interface to the index manager 210. The index manager node may also be connected to the coordinator 108 for watching the current shard configuration information.

Incoming messages may be classified based on the shard configuration, and new indexing tasks that can be created based on the type of messages. Table 1 below describes example structures of these messages:

TABLE 1

| Message | Schema | Description |
|---|---|---|
| <CIFType> | CIF<br>CIF File Path<br>DATA position<br>ENDOFDATA position<br>Num Items | Type definition for CIF catalog. |
| New Subscription | CIF: CIFType<br>CIF Edited File Path: CIFType<br>Tenant ID: String<br>Timestamp: long | Submits the new indexing task. |

TABLE 1-continued

| Message | Schema | Description |
|---|---|---|
| New Version | Subscription Name: String<br>Closure Argument: String<br>CIF: CIFType<br>CIF Edited File Path: CIFType<br>Tenant ID: String<br>Timestamp: long<br>Subscription Name: String<br>Closure Argument: String<br>Version: int | Creates a new version of the specified catalog. The incremental loaded version is relayed to active cores using a special NRTUpdate message. |
| Delete Version | Tenant ID: String<br>Timestamp: long<br>Subscription Name: String<br>Closure Argument: String<br>Version: int | Deletes a Version |
| Delete Subscription | Tenant ID: String<br>Timestamp: long<br>Subscription Name: String<br>Closure Argument: String | Delete all versions for a given subscription |

Figure 3:
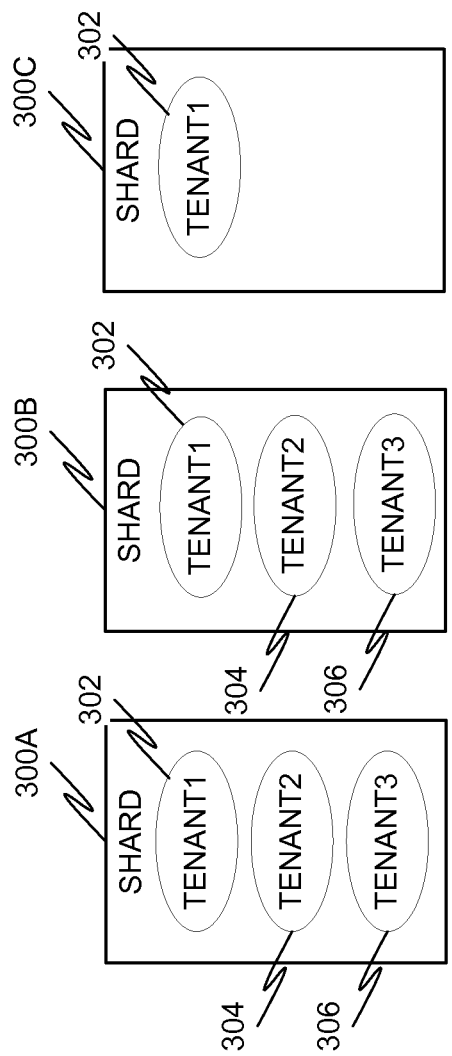
FIG. 3 is a diagram illustrating an example of elastic assignment of tenants to shards in accordance with an example embodiment.

FIG. 3 is a diagram illustrating an example of elastic assignment of tenants to shards, in accordance with an example embodiment. There are three shards 300A, 300B, and 300C. The first tenant 302 may be the largest and may be distributed/copied among all three shards 300A, 300B, and 300C. The second tenant 304 may be smaller and fit on a single shard but, for high availability purposes, is replicated on both shards 300A and 300B. Likewise, a third tenant 306 may be smaller and fit on a single shard but, for high availability purposes, is replicated on both shards 300A and 300B. Shard 300A and shard 300B may then be fully occupied, whereas shard 300C may have room for more tenants. The assignments depicted here may be dynamically assigned. Thus, for example, if the size of the first tenant 302 shrank significantly while the size of the second tenant 304 grew significantly, the tenants 302, 304 could be redistributed so that the first tenant 302 was only present on shard 300A and shard 300B while the second tenant 304 was present on all three shards 300A, 300B, and 300C.

The total capacity of the search infrastructure 200 is proportional to the number of index nodes 208. The capacity of an index node 208 may be defined in terms of two parameters: index size (the amount of data it can support) and throughput (the number of search results it can handle per second).

The capacity requirement for a tenant may be specified via three variables: index size increment (capacity the tenant will need in a given time window, e.g., number of active catalog items or number of transactions per year), throughput (e.g., number of expected searches per second), and a replication factor (number of times the data has to be replicated to support HA needs, which in the above example is two).

The index map 212 may be the data structure used by the index manager 210 to store tenant-to-shard mappings. The data itself may be stored in the distributed database 106. In an example embodiment, the data structure is defined as described in Table 2.

TABLE 2

| Element name | Description | Usage |
|---|---|---|
| segment_name | It can be tenant name, ANID or any other data segmentation field value. | |

TABLE 2-continued

| Element name | Description | Usage |
|---|---|---|
| object_class | Index manager will index catalog, requisitions, cXML docs, etc. | |
| current_shard | List of shards containing the current data, e.g., shard-1a:shard-3b:shard45c. This means the current data for a given segment is replicated in shard-1a, shard-3b and shard-3c. | Index manager uses it for publishing tenant Index manager should update it when a tenant is assigned a new shard. |
| recent_shards | List of shards that contain the recent data. Use some syntax to identify replication (e.g., shard-1a:shard-1b, shard24d:shard34c). | Used by data nodes to determine the data nodes to execute the federated query. Index manager should update it when a tenant is assigned a new shard. |
| all_shards | List of all shards in chronological order. | Data nodes use this to execute federated search for older data. |

In an example embodiment, each shard holds an index for multiple tenants. For each tenant, the index may include both primary data and auxiliary data. The primary data index can contain auxiliary reference keys.

Figure 4:
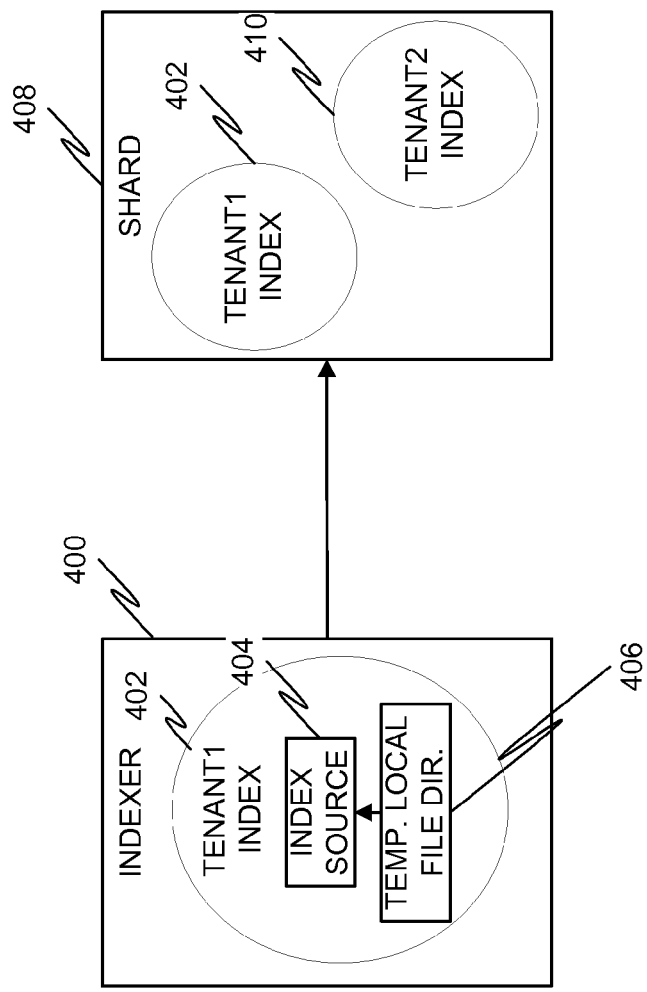
FIG. 4 is a diagram illustrating an indexer and shard in accordance with an example embodiment.

FIG. 4 is a diagram illustrating an indexer 400 and shard 408, in accordance with an example embodiment. Here, the indexer 400 may store a first tenant index 402. The first tenant index 402 may hold the index source 404 in the distributed database (e.g., the distributed database 106 of FIG. 1). When the indexer 400 receives a publish request, it can copy the index to a temporary local file directory 406, update the first tenant index 402 with data from the request, then copy the first tenant index 402 back to the distributed database 106. After the whole first tenant index 402 is ready, it can be written to the corresponding shard 408, where it can be stored with a second tenant index 410.

In an example embodiment, each shard 408 represents a final manifestation of a Lucene index ready for searching.

In an example embodiment, full indexing of data can be performed as needed. This is in contrast to previous solutions which could not change the shape of the index.

In an example embodiment, the search component and the indexing component are kept separate, which allows them to run independently and potentially simultaneously. For example, while one tenant is uploading additional data for a catalog to be indexed to the indexing component, another tenant could be searching an existing version of the catalog.

Figure 5:
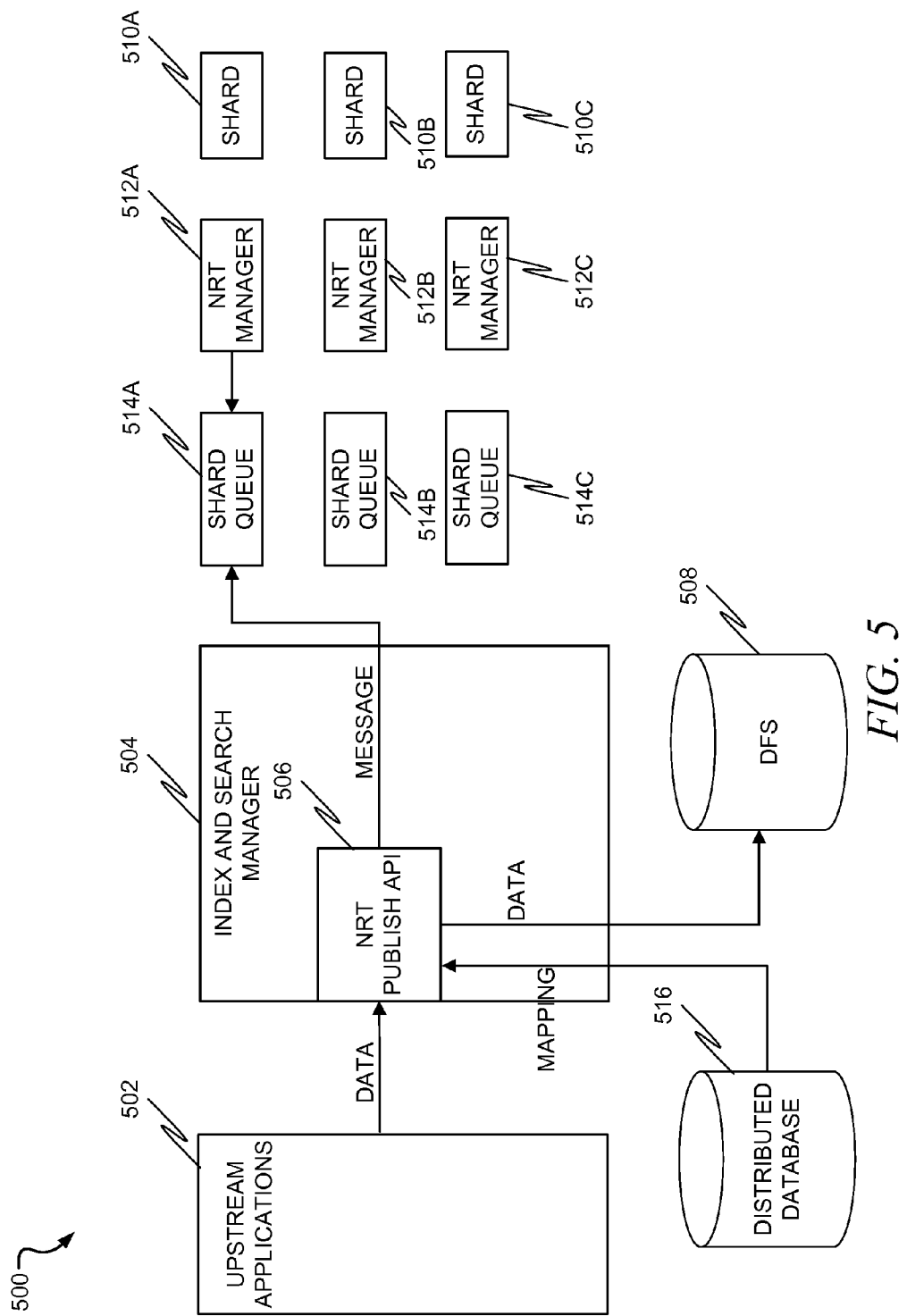
FIG. 5 is a block diagram illustrating a system, in accordance with an example embodiment, for near real time indexing.

As described earlier, in an example embodiment, in order to improve indexing speed to near real time, each shard 408 is assigned a queue and a near real time manager. A specialized application program interface (API) is also provided. FIG. 5 is a block diagram illustrating a system 500, in accordance with an example embodiment, for near real time indexing. Here, one or more upstream applications 502 send data to an index and search manager 504 to be stored and indexed. Rather than send this data directly to the engines inside the index and search manager 504, the upstream applications 502 may be provided with access to a near real time (NRT) publish API 506. The NRT publish API 506 acts to store the data itself in a distributed file system (DFS) 508 (such as a Hadoop distributed file system (HDFS)). Additionally, as described earlier, each shard 510A-510C is provided with its own NRT manager 512A-512C and shard queue 514A-514C. The NRT publish API 506 places a message in the appropriate shard queue (here shard queue 514A) that corresponds to the shard (here shard 510A) that is responsible for the data. The message indicates an urgent need to index the data. An NRT manager (here NRT manager 512A) may continuously monitor the corresponding shard queue (here shard queue 514A) looking for these types of messages. Upon detecting such a message in a shard queue (here shard queue 514A), the NRT manager (here NRT manager 512A) may parse it and convert it to an indexing document, such as a Lucene document. As will be described in more detail below, the NRT publish API 506 may determine which shard 510A-510C is responsible for the data (and thus the shard queue 514A-514C to which to send the message) based on a mapping stored in a distributed database 516, such as an HBase.

The goal of the NRT publish API 506 is to allow clients to send data that needs to be made available for search in near real time (e.g., less than a minute). In an example embodiment, the data is sent in a data serialization format, such as AVRO. The data is a set of records, each record corresponding to a searchable document/artifact. Each record may also have a field labeled "version number" or the like. The value for this field may be numeric and, for every change to the corresponding document/artifact, this value can be greater than the previous value. The value for this field may be used by the NRT manager 512A-512C to determine whether a particular record is newer than the one already present in the appropriate shard 510. If it is not newer, there is no need to index that particular record at that time.

The shard queues 514A-514C are each defined for a different shard 510A-510C. In an example embodiment, these shard queues 514A-514C are persisted. Each shard queue 514A-514C may be a messaging queue that guarantees message delivery.

The data sent to the NRT publish API 506 may contain, for each record, a primary document identification (ID) and a tenant identification. This information may then be used to determine to which shard queue 514A-514C to send the message. In an example embodiment, the distributed database 516 may contain a tenant information mapping and a shard information mapping. The determination of which shard queue 514A-514C to send the message to may be performed by taking the tenant ID of the record and looking it up in the tenant information mapping, which informs the NRT publish API 506 of the shard ID corresponding to the tenant (and thus which shard 510A-510C is responsible for the primary document). The shard ID may then be used to look up additional shard information, such as shard location and parameters, in the shard information mapping.

The NRT publish API 506 then sends a message to the shard queue 514A-514C associated with the identified shard 510A-510C. It should be noted that, in some example embodiments, replication of shards 510 or portions of information on shards 510 might necessitate the sending of messages to multiple shard queues 514A-514C for a single piece of data, due to the fact that multiple shards 510A-510C may be responsible for that piece of data.

Each NRT manager 512A-512C may, in an example embodiment, be a daemon thread that runs on a search core 124. As described earlier, the search core 124 is a server that services the search requests from applications. Each shard 510A-510C may have a search core 124 exclusively assigned to it. In some embodiments, the term "shard" and "search core" may be used interchangeably. The goal of the NRT manager 512A-512C is to listen for messages on the corresponding shard queue 514A-514C and act accordingly. The NRT manager 512A-512C reads any new messages and uses the information in these messages to locate the data file itself from a temporary DFS 508 location. The NRT manager 512A-512C then parses the AVRO data and calls an application specific adapter to convert the data to a Lucene document. The NRT manager 512 then looks up the document in the appropriate shard 510A-510C and determines, using the version field in each record, if the document needs to be updated in the shard 510. To apply the change to the shard 510, the value of this field should be greater than that from the shard 510. Assuming the shard 510 should be updated, the NRT manager 512A-512C then updates the shard 510. It should be noted that, in some example embodiments, such updates do not survive if the search core 124 fails or is restarted prior to the update taking effect. For this reason, in these example embodiments, the NRT manager 512A-512C does not confirm the message in the shard queue 514A-514C until a new version of the shard 510 becomes available.

Additionally, in some example embodiments, the NRT manager 512A-512C does not confirm the message until the Application sends the data using a batch publish API. Specifically, many applications will wait to send groups of data in a batch format in order to reduce management and bandwidth usage. The sending of an individual piece of data to the NRT publish API 506 does not stop that same piece of data from later being included in one of these batch communications. When the batch processing completes, a new version of the shard 510 is created. Since the application also sends the changed data as part of the batch publish, the new index will contain the data that was previously sent using the NRT publish API 506. However, after the application sent the batch publish data, more NRT data could be sent. Thus, there may be some NRT changes that are present as part of the new index and some changes that are not part of the index. Thus, when the search core 124 swaps the old index with the new one, the NRT manager 512 may process all pending messages and determine whether a message is already part of the new index. If so, such messages are confirmed. If not, they are reapplied to the new index.

Additionally, the search core 124 can be restarted due to power failure or regular maintenance. Since the messages in the persistent queue are not confirmed, the message will go to a new state in the event that the search core 124 is shut down. When the search core 124 starts up, it can again process the messages from the queue 140 and reapply them. Thus, data applied using NRT is not lost when the server restarts.

In addition to the embodiments described above, there are other embodiments that can be used to achieve near real time search by sending NRT messages to search cores 124. In one example embodiment, each shard 510 has one non-persistent shard queue 514. A single persistent queue is provided for recovery purposes. A search core 124 then consumers messages from the non-persistent queue and confirms the messages. The messages in the non-persistent queue are then used when a new shard 510 gets loaded to the search core 124 or the node restarts.

In another example embodiment, each primary document has a persistent queue, while a single search core 124 listens to many different persistent queues.

As described above, in an example embodiment, there is one persistent shard queue 514 for NRT per shard 510. It should be noted that, in some example embodiments, each shard 510 already has a persistent queue, used for shard writing. Thus, in some example embodiments, each shard 510 may, in fact, have two different persistent queues.

In an example embodiment, the shard queues 514 may be dynamically initialized at runtime. The mapping between the shard queue 514 and the search core 124 is then stored.

Additionally, in an example embodiment, the NRT Publish API 506 takes as input a tenant ID, primary document ID, primary document version, local, etc. as parameters. When applications call the NRT Publish API 506, the server implementation can parse the message and put the AVRO data in the DFS 508 in a special location that is specific to the particular search core 124. Then the NRT Publish API 506 can create a new message and put it in the queue 140 for the search core 124.

The NRT manager 512 listens for messages on the shard queue 514 that it is associated with. When a message arrives, in an example embodiment, the following process may be performed:
(1) Read the message from the queue 140. Create an instance of NRTUpdateJob. The NRTUpdateJob gets passed around and is also used for managing the life-cycle of the NRT publish requests from the queue 140.
(2) Using the tenant and adaptor id, get the AVRO schema from DFS 508.
(3) Get the Default Schema and add the fields from the AVRO schema. With this, the Schema now has information about all the fields that the AVRO data for the tenant will need.
(4) Read the primary data file from DFS 508 and generate the individual AVRO records.
(5) Using the records, and the Schema (generated previously), use the adaptor APIs to generate the Lucene Documents.
(6) Add the set of Lucene Documents to the NRTUpdateJob.
(7) For each Lucene Document, check if the document is stale. This is done by using the UniqueField as the lookup field. In an example embodiment, this is hard coded as bo_BaseId, but, in other embodiments, this can be specified by the application in the NRTPublishRequest. The current index may be searched using the unique field and get the document. Then the new document and the one from the index are compared using the version field. If the version of the record in the index is same as or higher than the one from the new doc, the document is removed from the NRTUpdateJob. This indicates that the new doc is stale and need not be applied to the index. After all the documents 136 from a particular NRTUpdateJob are processed, it is checked if there are any documents 136 that were applied to the index (meaning they were not stale), then the NRTUpdateJob is added to a list of pending jobs (which is a member level list in NRTManager). On the other hand, if all the documents 136 were stale in the NRTUpdateJob, then the primary data file is deleted from DFS 508 and the shard queue message is marked as confirmed. This indicates that all the documents 136 from the NRTUpdateJob were already in the index (mostly because a new index was created by the regular flow and the search core 124 was updated with that index).

When the events described above happen, it results in a call to the NRT Manager 512's handleNewCore( ) method. This method checks if the new index passed in is different than that which it holds a reference to. If so, the NRT Manager 512 updates its reference. It then processes all the pending NRTUpdateJobs from the pending list. Note that this is the list of jobs that were applied to the previous version of the index.

For each pending NRTUpdateJob, the Lucene Documents are processed. If the document was already applied to the index, it is dropped; otherwise it is reapplied to the new index. At the end, it is checked if all the documents 136 from the NRTUpdateJob were stale (that means they were present in the index and thus were not applied). If documents 136 were stale, then the job is marked as complete—which means the primary data file is deleted from the DFS 508 and the message is marked in the shard queue 514 as complete. At this point, the NRTUpdateJob is also removed from the list of pending jobs. When all the pending jobs are processed, the method returns.

Note that, in some example embodiments, the NRT Manager 512 relies on auto-soft-commit (every 10 s) to soft commit the changes to the index. In another example embodiment, the auto-soft-commit is performed easily. This is done because it is quicker and the thread calling NRT Manager 512 need not wait for 10 s to ensure that the new index has all the changes from the previous version.

Figure 6:
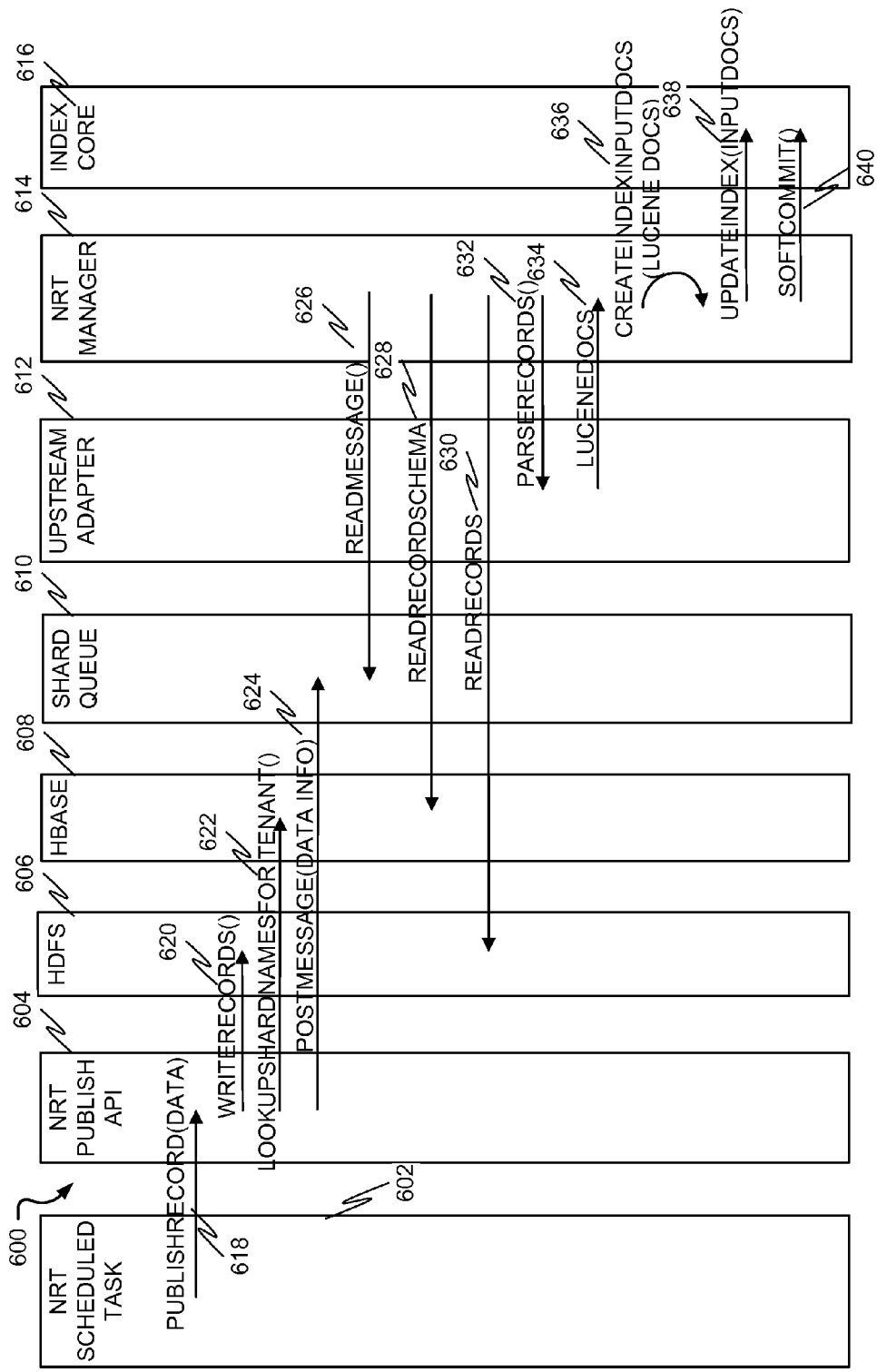
FIG. 6 is a sequence diagram illustrating a method, in accordance with an example embodiment, of near real time indexing flow.

FIG. 6 is a sequence diagram illustrating a method 600, in accordance with an example embodiment, of near real time indexing flow. The method 600 involves many components, including an NRT scheduled task 602, NRT publish API 604, HDFS 606, Hbase 608, shared queue 610, upstream adapter 612, NRT manager 614, and index core 616. At operation 618, the NRT scheduled task 602 issues a publishrecord instruction (with data as argument) to the NRT publish API 604. At operation 620, the NRT publish API 604 issues a writerecords request to the HDFS 606, causing the storing of the records from the data to the HDFS 606. At operation 622, the NRT publish API 604 issues a look up shard name request to Hbase 608 to obtain the shard name corresponding to a tenant of the data. At operation 624, this shard name is used by the NRT publish API 604 to issue a postmessage command with information about the data to the shard queue 610 corresponding to the shard name.

Periodically, at operation 626 the NRT manager 614 issues a readmessage command to the shard queue 610. When a message is encountered, at operation 628 a readrecordschema request is used to obtain a schema, from the Hbase 608, for the records corresponding to the data about which the message pertains. Then, at operation 630 the records themselves are read from the HDFS 606. At operation 632, an upstream adapter 612 is used to parse the records into Lucene documents, which are returned at operation 634. At operation 636, the Lucene documents are used to create a Lucene index. Then at operation 638, the index core 616 is called to update the index. At operation 640, a softcommit may be issued.

Figure 7:
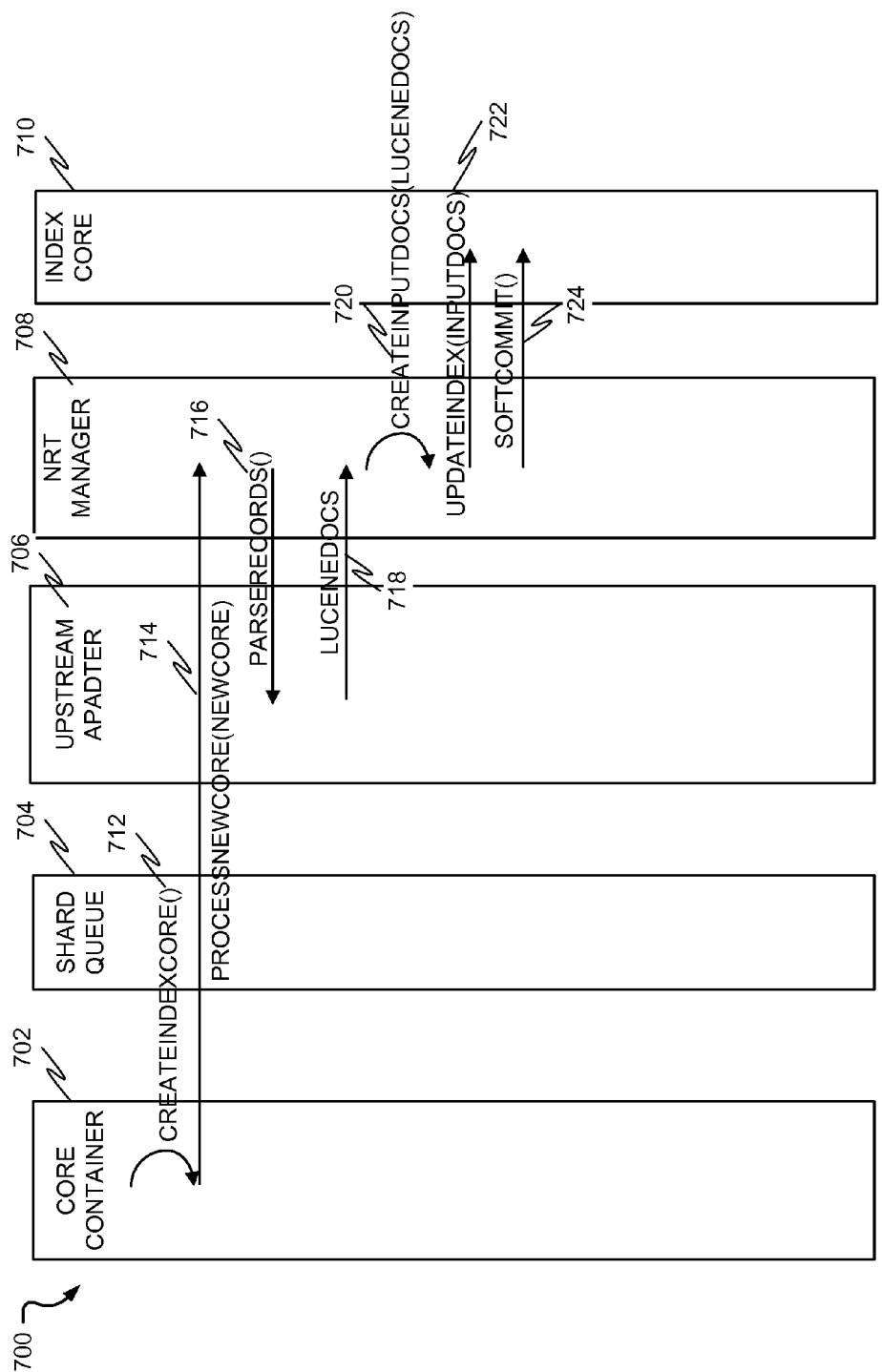
FIG. 7 is a sequence diagram illustrating a method, in accordance with an example embodiment, of handling a handle new core call.

FIG. 7 is a sequence diagram illustrating a method, in accordance with an example embodiment, of handling a handlenewcore call. The method 700 involves many components, including a core container 702, shard queue 704, upstream adapter 706, NRT manager 708, and index core 710.

At operation 712, an index core 710 is created by the core container 702. At operation 714, a request to process the new core is sent to the NRT manager 708. At operation 716, the NRT manager 708 issues a command to parse records to the upstream adapter 706. Then, at operation 718, Lucene documents are returned. At operation 720, the NRT manager 708 creates new input documents using the Lucene Documents. Then, at operation 722, the NRT manager 708 issues a command to update the index to the index core 710. Then, at operation 724, a softcommit may be issued.

Figure 8:
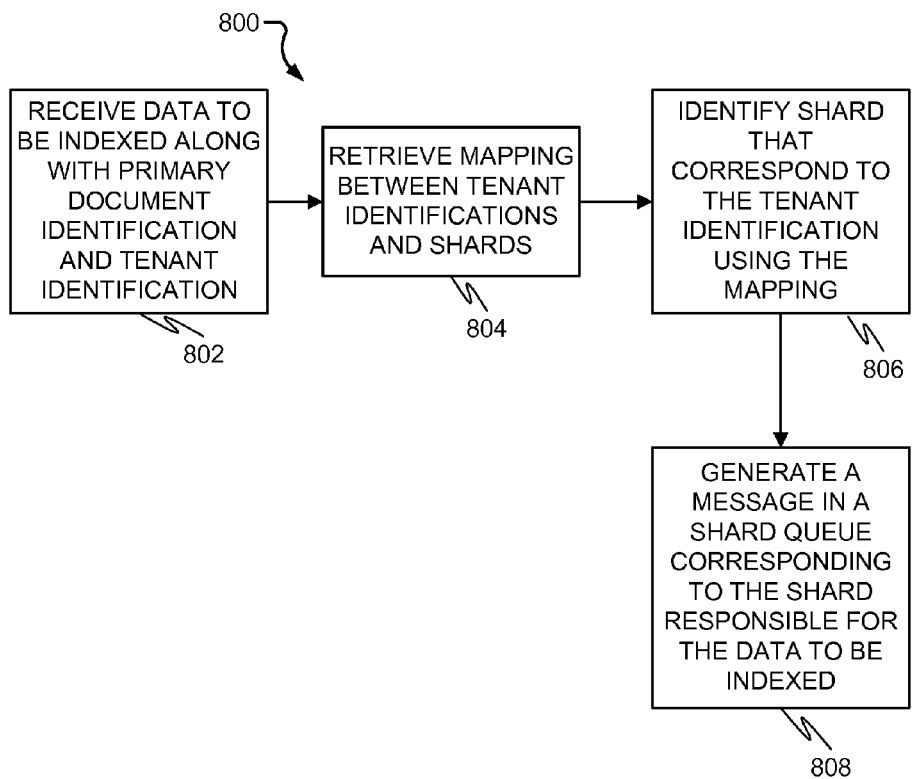
FIG. 8 is a flow diagram illustrating a method, in accordance with an example embodiment, of near real time indexing.

FIG. 8 is a flow diagram illustrating a method 800, in accordance with an example embodiment, of near real time indexing. At operation 802, data to be indexed in a distributed file system is received via a near real time publish application program interface (API). This data may be received along with a primary document identification and a tenant identification. At operation 804, a mapping between tenant identifications and shards is retrieved from a distributed database. At operation 806, a shard that corresponds to the tenant identification received is identified using the mapping. At operation 808, a message is generated in a shard queue corresponding to the shard responsible for the data to be indexed. The message may indicate that data needs to be urgently indexed. The detection of the message in the shard queue by a near real time manager corresponding to the shard responsible for the data to be indexed then causes the near real time manager to cause the data to be indexed.

Example Mobile Device

Figure 9:
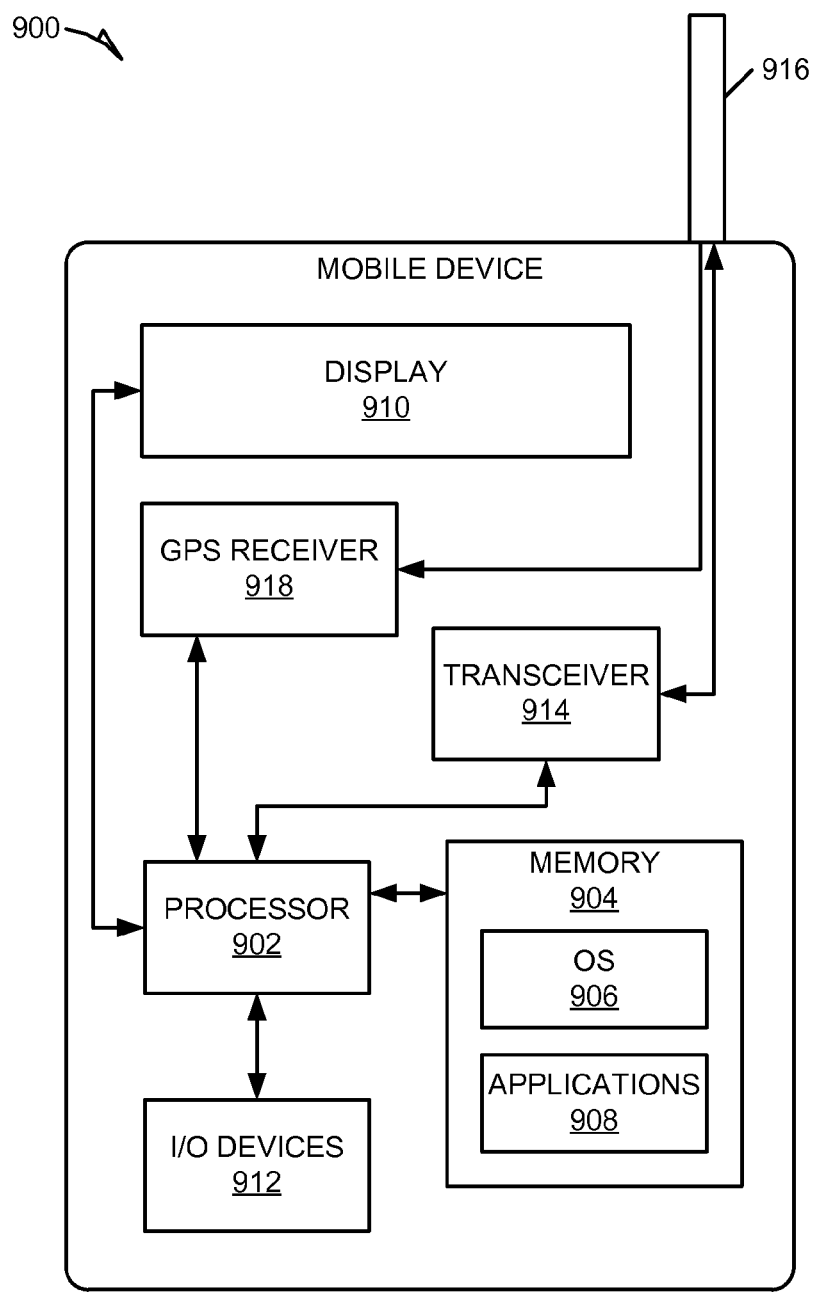
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location-enabled application that may provide location-based services to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) of one or more processors (e.g., processor 902) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 902 or other programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 may be configured as respective different hardware-implemented modules at different times. Software may accordingly configure a processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processor or processors 902 may be located in a single location (e.g., within a home environment, an office environment or as a server farm), while in other embodiments the processors 902 may be distributed across a number of locations.

The one or more processors 902 may also operate to support performance of the relevant operations in a "cloud computing" environment or as a "software as a service" (SaaS). For example, at least some of the operations may be performed by a group of computers (as examples of machines including processors 902), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 902 executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 902), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
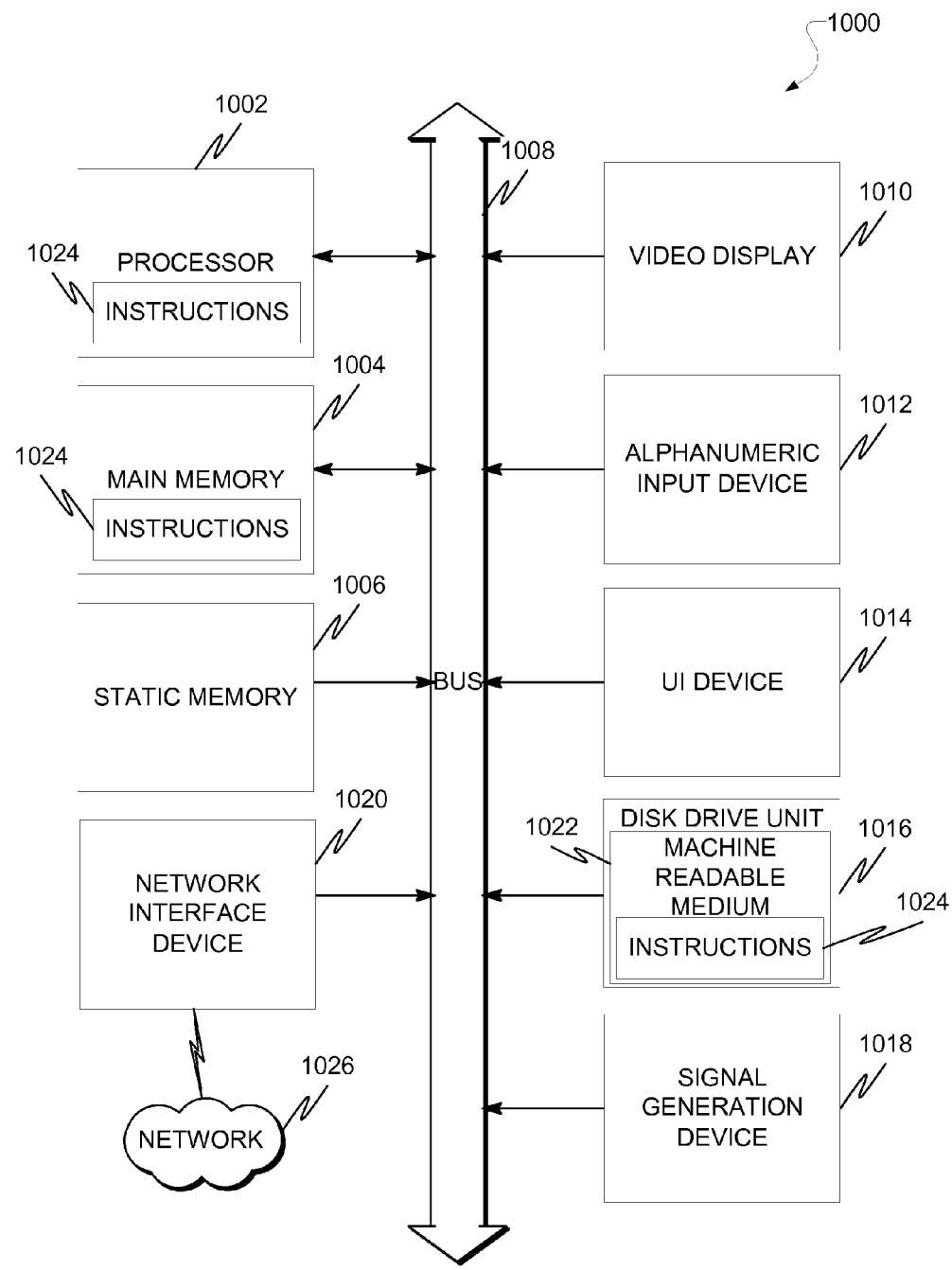
FIG. 10 is a block diagram of a machine in the example form of a computer system within which instructions may be executed for causing the machine to perform any one or more of the methodologies discussed herein.

FIG. 10 is a block diagram of machine in the example form of a computer system 1000 within which instructions 1024 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database 516, and/or associated caches and servers) that store the one or more instructions 1024 or data structures. The term "machine-readable medium" shall also be taken to include any tangible medium that is capable of storing, encoding or carrying instructions 1024 for execution by the machine and that cause the machine to perform any one or more of the methodologies of the present disclosure or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   partitioning a distributed file system into a plurality of shards;
   for each of the plurality of shards, creating a shard queue corresponding to the shard to improve indexing speed to near real-time;
   receiving, via a near real time publish application program interface (API), data to be indexed in the distributed file system;
   determining a shard, from the plurality of shards, responsible for the data to be indexed, the determining the shard responsible for the data to be indexed comprising:
      retrieving a mapping between tenant identifications and shards from a distributed database; and
      identifying a shard that corresponds to the tenant identification received with the data to be indexed from the mapping; and
   generating a message in a shard queue corresponding to the shard responsible for the data to be indexed, the message indicating that data needs to be urgently indexed, the detection of the message in the shard queue by a near real time manager corresponding to the shard responsible for the data to be indexed causing the near real time manager to cause the data to be indexed.

2. The method of claim 1, wherein the data to be indexed is received along with a primary document identification and a tenant identification.

3. The method of claim 1, wherein the distributed database is a Hadoop-based distributed database.

4. The method of claim 1, wherein the generating the message includes locating the shard queue based on information corresponding to the shard in the mapping.

5. The method of claim 1, further comprising storing the data in a distributed file system.

6. The method of claim 1, further comprising receiving the data separately as part of a batch of data received via a communications mechanism other than the near real time publish application program interface (API).

7. A system comprising:
   one or more hardware processors;
   a distributed file system distributed among a plurality of shards, each shard having a different corresponding shard queue to improve indexing speed to near real-time;
   a search core comprising a shard from the plurality of shard queues, a corresponding shard queue, and a near real time manager;
   an index and search manager, executable by the one or more hardware processors and configured to:
   receive, via a near real time publish application program interface (API), data to be indexed in the distributed file system;
   determine that the shard is responsible for the data to be indexed, the determining the shard responsible for the data to be indexed comprising:
      retrieving a mapping between tenant identifications and shards from a distributed database; and
      identifying a shard that corresponds to the tenant identification received with the data to be indexed from the mapping; and
   generate a message in the shard queue, the message indicating that data needs to be urgently indexed; and
   the near real time manager configured to continuously monitor the shard queue and, in response to a detection of the message, cause the data to be indexed.

8. The system of claim 7, wherein the data to be indexed is received along with a primary document identification and a tenant identification.

9. The system of claim 7, wherein the distributed database is a Hadoop-based distributed database.

10. The system of claim 7, wherein the generating the message includes locating the shard queue based on information corresponding to the shard in the mapping.

11. The system of claim 7, wherein the index and search manager is further configured to store the data in a distributed file system.

12. A non-transitory machine-readable storage medium comprising instructions, which when implemented by one or more machines, cause the one or more machines to perform operations comprising:
   partitioning a distributed file system into a plurality of shards;
   for each of the plurality of shards, creating a shard queue corresponding to the shard to improve indexing speed to near real-time;

receiving, via a near real time publish application program interface (API), data to be indexed in the distributed file system;
determining a shard, from the plurality of shards, responsible for the data to be indexed, the determining the shard responsible for the data to be indexed comprising:
  retrieving a mapping between tenant identifications and shards from a distributed database; and
  identifying a shard that corresponds to the tenant identification received with the data to be indexed from the mapping; and
generating a message in a shard queue corresponding to the shard responsible for the data to be indexed, the message indicating that data needs to be urgently indexed, the detection of the message in the shard queue by a near real time manager corresponding to the shard responsible for the data to be indexed causing the near real time manager to cause the data to be indexed.

13. The non-transitory machine-readable storage medium of claim 12, wherein the data to be indexed is received along with a primary document identification and a tenant identification.

14. The non-transitory machine-readable storage medium of claim 12, wherein the distributed database is a Hadoop-based distributed database.

15. The non-transitory machine-readable storage medium of claim 12, wherein the generating the message includes locating the shard queue based on information corresponding to the shard in the mapping.

16. The non-transitory machine-readable storage medium of claim 12, wherein the operations further comprise storing the data in a distributed file system.

17. The non-transitory machine-readable storage medium of claim 12, wherein the operations further comprise receiving the data separately as part of a batch of data received via a communications mechanism other than the near real time publish application program interface (API).

* * * * *